Sept. 20, 1960 R. H. COTHER 2,953,761
RESISTANCE COIL AND METHOD OF MANUFACTURE
Filed Aug. 6, 1957 2 Sheets-Sheet 1

INVENTOR.
ROBERT H. COTHER
BY
ATTORNEY

Sept. 20, 1960     R. H. COTHER     2,953,761
RESISTANCE COIL AND METHOD OF MANUFACTURE
Filed Aug. 6, 1957     2 Sheets-Sheet 2
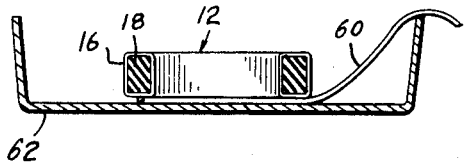
FIG. 6.
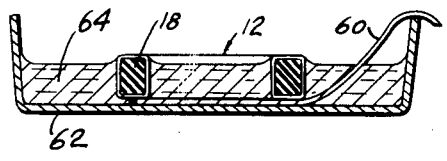
FIG. 7.
FIG. 8.
FIG. 9.
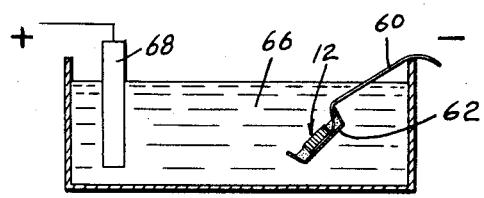
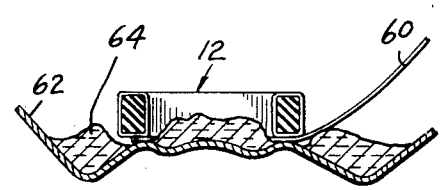
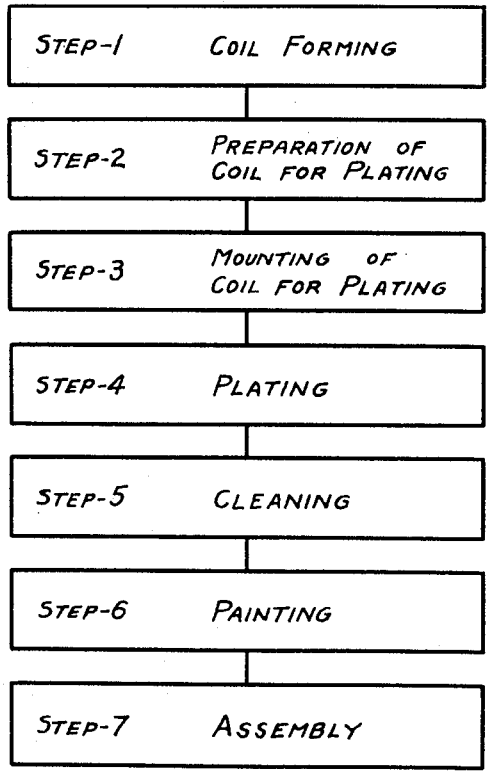
FIG. 11.
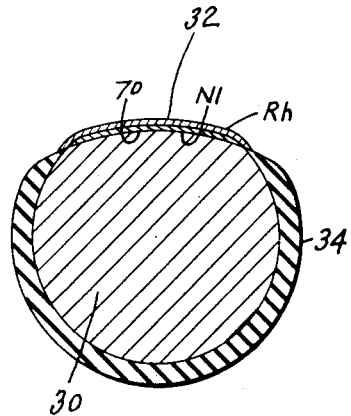
FIG. 10.
INVENTOR.
ROBERT H. COTHER
BY
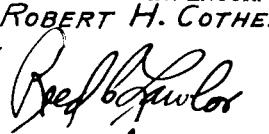
ATTORNEY United States Patent Office 2,953,761
Patented Sept. 20, 1960

2,953,761

RESISTANCE COIL AND METHOD OF MANUFACTURE

Robert H. Cother, Fullerton, Calif., assignor to Harry Dudley Wright, Altadena, Calif.

Filed Aug. 6, 1957, Ser. No. 676,623

8 Claims. (Cl. 338—143)

This invention relates to improvements in variable resistors, especially electrical potentiometers, and more particularly to a method for manufacturing the improved variable resistors. Though the invention is also applicable to rheostats and to multipots, it will be described in detail with particular reference to two-terminal potentiometers.

As is well known, electrical potentiometers are frequently employed as control elements in dynamic systems which are subject to frequent or continual changes. Such a potentiometer includes a winding having at least two terminals across which a voltage is applied and at least one slider, or moving contact, which slidably engages successive turns of the winding to supply a variable fraction of the voltage to an output circuit. Potentiometers used for such purposes must be accurately wound to provide a voltage which varies as an accurately predetermined function of slider position. Ideally, such potentiometers should have characteristics which are substantially constant and dependable under a wide variety of conditions and should provide reproducible results over long periods of use. A potentiometer which is designed to meet the foregoing requirements is often called a precision potentiometer.

In accordance with this invention, a precision potentiometer is provided in which a coil of wire is wound on a non-magnetic core and in which the body of the wire consists of one material and in which stationary contact segments formed on the wire body are composed of another material. The main body of the wire is composed of a material selected from materials having characteristics that are particularly desirable from the point of view of providing a selected, usually low, temperature coefficient of resistivity, high specific resistivity, and characteristics favorable for manufacturing, such as high tensile strength, high ductility, and high ability to be drawn to a fine size. The contact segments are plated on the turns of the coil. The contact segments are composed of materials which have low specific resistivity, low contact resistance in relation to the material of the slider, or moving contact, high reliability when the pressure of the slider is low. The materials of the contact segments are also of a type which produce low noise in response to movement of the slider thereacross and which also provide low thermoelectric potentials when combined with the slider. The body of the coil, other than the contact segments, is usually composed of a corrosive material, that is a material subject to corrosion. For this reason, the parts of the body upon which the segments are not deposited are coated with insulating material which is stable under ambient atmospheric and other conditions of use. The contact segments themselves are composed of a material which is non-corrosive and has stable electrical characteristics under widely varying conditions of use.

Applicant's invention, both with respect to the nature of his improved potentiometer and as to a method of manufacture, may be more readily understood from the following description of a specific embodiment thereof taken in connection with the accompanying drawings, in which.

Figs. 6, 7, 8, 9, and 10 are views showing several stages in the manufacture of the potentiometer coil; and Fig. 11 is a block diagram employed in the description of applicant's method of manufacture.

Figure 1:
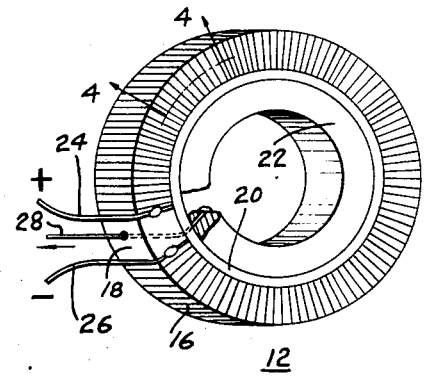
Figure 1 is a perspective view of my improved potentiometer with the slider removed.
Figure 2:
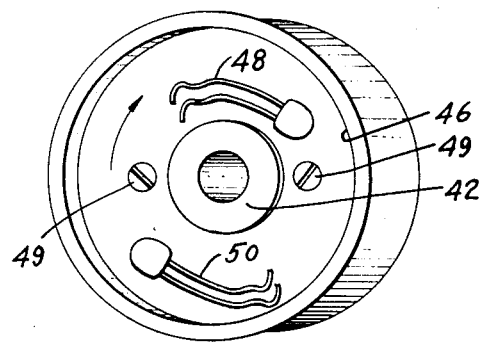
Fig. 2 is a perspective view of a slider and carriage.
Figure 3:
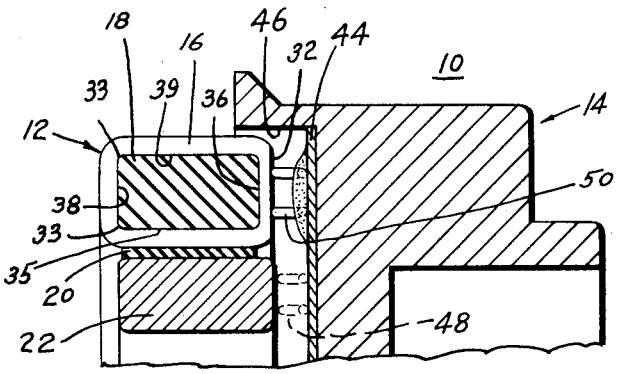
Fig. 3 is a fragmentary longitudinal sectional view of the potentiometer.

In the two-terminal precision potentiometer 10 embodying this invention, as shown particularly in Figs. 1, 2, and 3, the potentiometer comprises an especially made stator 12 and a cooperating rotor 14. The stator 12 comprises a coil 16 wound on a non-magnetic core 18 separated by an insulating spacer 20 from a metallic slip ring 22. The ends of the coil 16 provide two terminals or leads 24 and 26, and a conductor, soldered or otherwise electrically connected to the slip ring 22, provides a third terminal or lead 28.

The coil is in the form of a winding consisting of a number of turns that are toroidally wound on the core 18. As shown in more detail in Figs. 4 and 10, the wire forming the windings consists of a body section 30 upon which are formed a plurality of separate contact segments 32 arranged in side-by-side relationship along an arc at the side of the stator that faces the rotor 14. As more fully explained hereinafter, the body 30 of the wire is composed of one metallic material and the contact segments 32 are composed of other material. The contact segments usually consist of more than one layer, the outer layer of which is composed of contact material and the other layers of which are deposited to aid in the deposition of the contact material. The contact segments are of uniform thickness and of other uniform characteristics so that they will have uniform wear characteristics, thus potentially having equal lives. The portions of the wire upon which the segments 32 are not located are coated with insulating material forming insulating layers of uniform thickness so that the wires may lie in accurately spaced side-by-side relationship on the inner surface 35 of the core 18, and so that the turns of the wire are slightly spaced from each other on the side surfaces 36 and 38, and on the outer surface 39 of the core.

The rotor 14 itself comprises a body, or base, of cylindrical configuration, which is rigidly counted to a rotatable shaft (not shown). The rotor body 14 may be composed of metal and, in such a case, it is provided with an insulating spacer 42 coaxially mounted at the center of the other body 30 in order to insulate the rotor body from the shaft. A metallic plate 44 composed of highly conductive material is firmly mounted within a recess 46. Two pairs of brushes 48 and 50 are conductively mounted on the plate 44. The inner brush 48 is located at such a position on the rotor 14 that it is maintained in contact with the slip ring 22 at all times as the rotor is rotated. The outer brush 40 is located at such a position on the rotor 14 that it is maintained in contact with one or more of the stationary contact segments 32 as the rotor 14 is rotated relative to the stator 12. In practice, each of the brushes 48 and 50 comprises a plurality of metallic members which are shaped to press resiliently with a very light force against the slip ring 22 and the coil 16 respectively so that only a low torque is required to move the rotor 14 from one position to another. In practice, the brushes 48 and 50 are soldered to the conductive plate 44, and they are then mounted firmly in position within the recess 46 of the rotor 14 by means of screws 49.

As indicated in Fig. 11, seven main steps are involved in the manufacture of my potentiometer.

Figure 5:
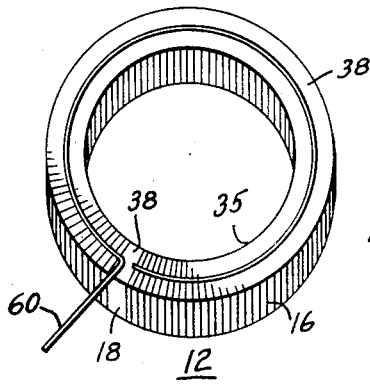
Fig. 5 is a perspective view of the winding in a preliminary stage of manufacture.

The first step in manufacturing the precision potentiometer of this invention is to form the coil. This step is accomplished by winding suitable selected wire 30 on the non-magnetic core 18, as shown in Fig. 5. In the specific embodiment of the invention described here, the wire itself is a Karma wire that is coated on all sides with a layer 34 of enamel. The core itself is of rectangular cross section, having rounded corners 33 as shown in Fig. 3. The wire is wound on the core in any conventional manner, and the turns are tightly held in place, being in contact with each other along the inner arcuate surface 35 of the core. The ends of the coil are firmly held in place by means of some suitable cement composed of insulating material.

Figure 4:
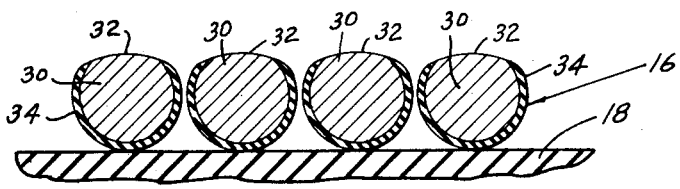
Fig. 4 is an enlarged detailed cross-sectional view showing several adjacent turns of the potentiometer coil.

The second step in the process is to prepare the coil form for electroplating. To do this, the winding is buffed on the opposite flat sides thereof adjacent the side faces 36 and 38. In this way, the insulation is removed from the segments of the wire on the two sides thereof. Those parts of the wire that are on the contact side 36 are further buffed, or lightly filed, so as to somewhat flatten the exposed parts thereof. Though perfect plane flatness is not required, nevertheless the curvature of these parts of the wire, which are the parts to be plated, is made much less than the curvature of the wire that is not so treated, as shown in Figs. 4 and 10.

A flexible plating lead 60 is then laid on the bare parts of the wire on the side 38. The plating lead and these bare parts are then painted with a conductive paint, such as silver paint. This paint is then dried, thus securing the plating lead 60 firmly to the coil wire 30. The plating lead 60 is in the form of a flexible strand conductor, such as a conductor consisting of seven strands of No. 22 copper wire. The plating lead 60 is of substantial diameter and of low conductivity and is thus electrically connected more or less directly to each of the turns of the coil for a special purpose which will be pointed out hereinafter.

The third step in the process involves mounting the coil so prepared to facilitate plating. In this stage the prepared coil shown in Fig. 5, having the plating lead electrically connected thereto, is placed in a paper cup 62 with the plating lead 60 on the bottom side thereof. Then the spaces within and surrounding the prepared coil are filled with a body 64 of wax up to the level of the upper surface 36 of the prepared coil, leaving the flattened bare areas of the turns of the winding exposed. The wax selected for this purpose is of a type which is inert in the presence of either acids or alkalies. Also, if desired, the buffing of the portions of the wiring which are to be plated may be performed after the winding assembly has been embedded in wax.

In the fourth step of the process, the mounted coil is immersed in a plating bath 66, as illustrated in Fig. 8. The plating bath is a water solution of a salt of a metal, such as rhodium or gold, suitable for forming contact segments. The plating terminal 60 is then connected to the negative terminal of a current supply, and an auxiliary electrode 68, one end of which is immersed in the plating bath 66, is connected to the positive terminal of the current supply. The portion of the plating lead 60 that lies beneath the plating liquid 66 is covered with insulating material so as to avoid the deposition of metal from the plating bath onto the plating lead itself.

The plating (electron) current is passed through the lead 60 into the coil and thence into the bath and out of the auxiliary terminal 68. By virtue of the fact that the plating terminal 60 is electrically connected to each turn of the coil, the plating current emerges from the exposed bare areas of all turns in equal amounts and at uniform current density, thus causing electrodeposition of metal from the plating bath in uniform rates onto the exposed bare parts of each of the turns.

The plating is discontinued prior to the time that the deposits of plated material become thick enough to short from one turn to another over the intervening spaces.

In practice, it is sometimes desirable to apply a flash coating of one material to the bare parts of the wire and then to plate with the contact material. For example, when a wire 30 composed of Karma metal is to be coated with rhodium, a flash coating 70 of nickel is deposited on the exposed bare spots of the wire, and then a coating composed of rhodium is deposited over the nickel.

It will be understood that other ways of plating the potentiometer on only one side thereof may be employed. Thus, for example, the portions of the potentiometer wire to be plated are lowered into the plating bath, and the portions of the coil that are not to be plated may be suspended above the plating liquid without immersing the plating lead 60. In this case, it is not necessary to mount the winding in a cup by means of a paraffin or the like prior to plating.

In this invention, the supply of current to the coil at a plurality of points thereof is important to the formation of stationary contacts of uniform thickness. Though this would not be required in the formation of contacts on a variable-current autotransformer, such as a Variac, in which the transformer has very low resistance, it is required in the manufacture of a potentiometer or other variable resistance in which the resistance has a comparatively high resistance of at least about one hundred ohms between terminals. By forming low-resistance contacts of uniform thickness, a variable resistance winding is thus provided that has a uniform wear-life throughout its length, thus extending the life of the potentiometer as a whole and also maintaining the resistance of the potentiometer substantially constant for a long time in spite of contact wear.

In the fifth step of the process, the plated coil is removed from the plating bath while still mounted in the cup 62. It is then washed or otherwise cleaned to remove any residual plating solution thereupon. The copper and paraffin are removed by breaking away from the coil, as indicated in Fig. 9. Then the plated coil is immersed in one cleaning solution which removes excess paraffin and then in another solution, such as acetone, which removes the silver paint and the plating lead 60.

Then, as a sixth step, the entire coil, except the parts upon which the stationary contacts 32 have been formed, is then painted with enamel or varnish or other insulating material and placed in a hot oven. By means of this treatment, the various turns of the coil are secured firmly to the core 18.

In the last and final step, the coil is assembled in the potentiometer. In the assembly process, the stator is first formed by firmly attaching the plated coil to the slip ring 22 and locating an insulating spacer between the coil and the slip ring 22, thus forming the stator 12 illustrated in Fig. 1. The rotor 14 of Fig. 2, which has been separately manufactured, is then assembled with the stator on a shaft and housing in any conventional manner to form the completed precision potentiometer.

By manufacturing a potentiometer by this process, the material of the potentiometer wire body and the material of the stationary contact segments may be separately selected almost completely independently of each other. In this way the potentiometer wire body may be made of a material which has desirable physical characteristics, such as ductility, specific resistivity, and temperature coefficient of resistivity, even though that material has poor contact characteristics, and the contact material may be selected to have superior contact characteristics. Thus this invention makes possible the almost complete separation of these two selection problems.

In one specific embodiment of the invention that has been found to be satisfactory, the core was composed of cylindrical cores of a hard phenolic condensation product, such as a phenol-formaldehyde resin, having a major radius of 0.720" and a minor radius of 0.560" and a length or axial width of 0.210". This core was then covered with a single layer winding of B & S Gage No. 40 Karma wire, which is a composition of nickel and chromium having small quantities of aluminum and iron present, manufactured by the Driver-Harris Company of Harrison, New Jersey. The specific wire employed was provided with an insulating coat of Formvar, an insulating varnish. The parts of the wire to be plated were brushed, polished, and flattened preparatory to plating. A copper flash was applied to these limited exposed areas of the wire, and then a coating of nickel having a thickness of 0.0001" and a coating of rhodium having a thickness of 0.00005" were applied in succession over the copper flash. The coil was then cleaned and then dipped in Formvar. After partial baking, the Formvar was then cleaned off the contact segments 20, and the baking operation was then completed. The total resistance of the potentiometer so formed was 2000 ohms.

Brushes used with this coil were type 1021 of J. M. Ney Company, made of Paliney 7, which is a heat-treated metal alloy of palladium, platinum, gold, silver, and copper. These brushes consisted of two wires having diameters of 0.010" bent to an inside radius of 0.020". The brushes were arranged to apply a pressure of five grams each to the coil. Since the brush material is softer than rhodium, the moving contact, which is easily replaced, is subject to greater wear than the stationary contact segments. The resultant potentiometer had very stable noise-free properties and was also of long life and was free of numerous objectionable characteristics, such as undesirable thermo-electric effects and departures of resistance from linearity. Furthermore, the potentiometer has low-torque characteristics and possesses highly constant characteristics of all kinds for a long time.

In order to improve the linearity of the potentiometer, a special process is employed between steps 5 and 6 to minimize irregularities of linearity. More particularly, between the time that the coil is cleaned and finally coated with insulating material prior to assembling, small amounts of wire may be removed from the parts of the coil which had previously been painted with silver paint so as to equalize the values of resistance of the individual turns between successive stationary contacts. In this way, a coil having a resistance which increases as a very nearly linear function of angular position of the rotor 14 is formed. A coil having a non-linear resistance that varies as a predetermined function of angular position of the rotor may be formed in a similar way.

From the foregoing, it is clear that I have provided an improved variable resistance and a novel method for manufacturing this resistance. Though only specific details of a two-terminal potentiometer and the process of manufacture have been described in detail, it will be understood that the improved potentiometer may have a structure somewhat different from that specifically described herein and that improved potentiometers and other variable resistors incorporating this invention may be made by other forms of the process. Various changes in the variable resistor which will now suggest themselves to those skilled in the art may be made both with respect to the form of the resistors, the materials of which they are made, the details of construction, and the arrangement of the elements, and in the steps of the manufacturing process without departing from the invention as defined by the following claims.

The invention claimed is:

1. In a variable resistance,
 a coil of insulated wire wound on a non-magnetic core and supported thereon in a stationary position, insulation being absent from limited exposed areas of successive turns of said coil along a path on one side of the coil, said coil having a terminal at at least one point thereof, and
 a movable metal contact slidably engaged with said limited exposed areas of successive turns of said coil lying along said path,
 said coil being formed by a wire having a wire body composed of conductive material, said wire bearing separate thin sections of conductive coating material only in the exposed areas of said turns adjacent the points of said wire that are engaged by said movable contact when moved along said path, said thin sections of conductive coating material being of flattened configuration and being composed of a material that is harder than the material of which said wire body and said movable contact are composed.

2. In a variable resistance,
 a coil of wire wound on a non-magnetic core and supported thereon in a stationary position, said coil having a terminal at at least one end thereof, and
 a movable metal contact slidably engaged with successive turns of said coil along a path on one side thereof,
 said coil having a plurality of separate segments of contact material formed on successive turns along said path, some of said turns being reduced in cross-section to equalize the resistance of successive turns.

3. In a variable resistance, as in claim 2, said reduction in cross-section being at points remote from said path.

4. The method of manufacturing a variable resistor which comprises the steps of
 winding a coil of insulated resistance wire on a form,
 removing the insulating material from parts of the coil along a line extending lengthwise of said coil to form a series of exposed wire portions along said line, said removing step also removing portions of said coil whereby each of said exposed wire portions is of flattened configuration,
 immersing the coil in a plating bath, and
 flowing electrical current into said coil at a plurality of points thereof remote from said exposed flattened wire portions whereby substantially equal amounts of said current leave said coil at said series of exposed flattened wire portions, thereby causing deposits of metal that is harder than the metal of said coil to be plated onto said exposed wire portions to form separate segments of coating of substantially uniform thickness and flattened configuration to be deposited on the respective exposed wire portions.

5. The method of manufacturing a variable resistor which comprises the steps of
 winding a piece of resistance wire on a form to form a coil thereon, placing said coil and form on a supporting structure,
 substantially covering the supporting structure coil and form with a solidifiable liquid material thereby to hold said coil and form in position relative to said supporting structure, said liquid material, upon solidification, exhibiting electrical insulation characteristics, said liquid material when solidified covering said entire coil and form except at a plurality of parts of said resistance wire that lie along a line, remote from said supporting structure that extends lengthwise of said coil, thereby forming a series of exposed wire portions along said line at positions remote from said supporting structure,
 immersing the coil and form in a plating bath, and
 flowing electrical current into said coil at a plurality of points thereof adjacent said supporting structure and remote from said exposed wire portions whereby substantially equal amounts of said current leave said coil at said series of exposed wire portions, thereby causing deposits of metal to be plated on said exposed wire portions to form separate segments of coating of substantially uniform thickness to be deposited on the respective exposed wire portions, and thereafter breaking said coil and form away from said supporting structure and solidified liquid material.

6. The method of manufacturing a variable resistor which comprises the steps of forming a coil of resistance wire on a form, said wire having substantially circular cross-section, immersing the coil and form in a liquid material which upon solidification exhibits electrical insulation characteristics, removing the insulating material from parts of the coil along a line extending lengthwise of said coil to form a series of exposed wire portions along said line, said removing step including the step of removing portions of said substantially circular wire whereby said exposed wire portions are of flattened configuration, immersing the coil and form in a plating bath, and flowing electrical current into said coil at a plurality of points thereof remote from said exposed wire portions whereby substantially equal amounts of said current leave said coil at said series of exposed flattened wire portions, thereby causing deposits of metal to be plated on said exposed wire portions to form separate segments of coating of substantially uniform thickness and flattened configuration on the respective exposed flattened wire portions.

7. The method of manufacturing a variable resistor which includes the steps of forming a coil comprising insulated resistance wire, removing the insulating material from two edges of the coil, applying conductive paint to one of such edges, applying an electrical connector to such painted edge, placing said coil and connector in an open-topped container, filling said container substantially to the level of the other edge of said coil with an insulating material adapted to leave only said other edge of said coil exposed and otherwise adapted to cover remaining portions of said coil including said painted edge, connecting such connector to a source of plating current, immersing said coil, connector, container and insulating material in a plating bath, applying a plating current for a predetermined period, thereby forming separate segments of plated coatings on the parts of said resistance wire along said exposed other edge, removing such plated coil, connector and container from said bath, and thereafter immersing said plated coil in a solvent for said insulating material and paint thereby to remove said insulating material and paint from said coil.

8. The method of manufacturing a variable resistor which includes the steps of forming upon a non-magnetic core a non-inductive insulated resistance winding in which the wire is exposed at a series of portions lying on a line extending lengthwise of said core, partially flattening the external parts of said exposed portions, and flowing electrical current into said coil at a plurality of points thereof remote from said flattened wire portions and substantially equal amounts of said current out of said coil at said series of flattened wire portions, thereby causing deposits of metal to be plated on said flattened wire portions to form separate segments of coating of substantially uniform thickness on the respective flattened wire portions.

References Cited in the file of this patent

UNITED STATES PATENTS

| | | |
|---|---|---|
| 1,426,769 | Pinney | Aug. 22, 1922 |
| 1,563,731 | Ducas | Dec. 1, 1925 |
| 1,847,653 | Jones et al. | Mar. 1, 1932 |
| 1,939,902 | Kaul | Dec. 19, 1933 |
| 2,023,603 | Lodge | Dec. 10, 1935 |
| 2,204,623 | Ruben | June 18, 1940 |
| 2,537,733 | Brenner | Jan. 9, 1951 |
| 2,849,350 | Roach | Aug. 26, 1958 |